United States Patent [19]

Theurer et al.

[11] Patent Number: 5,727,474
[45] Date of Patent: Mar. 17, 1998

[54] FREIGHT CAR FOR STORAGE OF BULK MATERIAL

[75] Inventors: Josef Theurer, Vienna; Manfred Brunninger, Altenberg, both of Austria

[73] Assignee: Franz Plasser Bahnbaumaschinen-Industriegesellschaft m.b.H., Vienna, Austria

[21] Appl. No.: 655,155

[22] Filed: May 28, 1996

[30] Foreign Application Priority Data

Jun. 30, 1995 [AT] Austria ..................... 1117/95

[51] Int. Cl.[6] .................................. B65G 67/00
[52] U.S. Cl. ..................... 105/355; 105/215.1; 104/2; 414/498; 414/528; 414/339
[58] Field of Search ............... 104/2, 3, 5, 137; 414/498, 528, 339; 105/355, 392, 215.1, 215.2

[56] References Cited

U.S. PATENT DOCUMENTS

| | | | |
|---|---|---|---|
| 3,446,517 | 5/1969 | Stewart et al. | 414/498 |
| 4,784,063 | 11/1988 | Theurer et al. | 104/3 |
| 5,173,028 | 12/1992 | Heikkinen et al. | 414/498 |
| 5,222,435 | 6/1993 | Theurer et al. | 104/2 |
| 5,284,266 | 2/1994 | Januel et al. | 414/498 |
| 5,364,221 | 11/1994 | Theurer et al. | 414/528 |
| 5,400,718 | 3/1995 | Theurer et al. | 104/2 |

FOREIGN PATENT DOCUMENTS

| | | | |
|---|---|---|---|
| 5-169935 | 7/1993 | Japan | 104/2 |
| 377398 | 6/1964 | Switzerland | 104/2 |

*Primary Examiner*—Mark T. Le
*Attorney, Agent, or Firm*—Henry M. Feiereisen

[57] ABSTRACT

A freight car includes a carrier frame supportable on track-bound undercarriages for mobility on a track, a box formed by side walls and a bottom for storing bulk material, and a conveyor belt constituting the bottom of the box and extending in longitudinal direction for conveying bulk material in a conveying direction. Further mounted to the freight car are two off-track undercarriages which are spaced from each other in longitudinal direction and vertically adjustable independently from each other by own drives.

10 Claims, 3 Drawing Sheets

FREIGHT CAR FOR STORAGE OF BULK MATERIAL

BACKGROUND OF THE INVENTION

The present invention refers to a freight car for storage of bulk material, and in particular to a freight car of a type having a carrier frame supported on track-bound undercarriages for mobility on a track, a box formed by side walls and a bottom, and a conveyor belt forming the bottom of the box and extending in longitudinal direction.

Freight cars of this type are known for example from U.S. Pat. Nos. 5,203,622, 4,809,617 and German Pat. No. 41 04 877 A 1. These conventional freight cars have proven their capabilities over many years and include essentially a carrier frame supported on undercarriages for enabling mobility along a track, and a storage box. The bottom of the box is formed by a longitudinally extending conveyor belt that cooperates with an adjacent transfer conveyor belt which projects outwards beyond an axial end of the freight car. The transfer conveyor belt is positioned at an angle relative to the bottom conveyor and transfers bulk material stored in the box to a further like freight car. The self-loading and self-unloading capability of this freight car is in particular advantageous when combining a plurality of such freight cars to a loading train.

SUMMARY OF THE INVENTION

It is an object of the present invention to provide an improved freight car for allowing a discharge of bulk material situated in a trackless zone in an economical manner.

This object, and others which will become apparent hereinafter, is attained in accordance with the present invention by providing the carrier frame with two off-track undercarriages which are spaced from each other in longitudinal direction and equipped with own drives to enable a vertical adjustment of the off-track undercarriages independently from each other.

Through further provision of two separately actuatable off-track undercarriages, the freight car can shuttle between a track end and a bucket excavator, which is situated in a renewal section, in order to transfer excavated bulk material to a dump car that is positioned at the track end. There is no need to undertake any modifications, and no limits are basically placed in the selection of scoops or bucket excavators. As the freight car is also supportable on track-bound undercarriages, the freight car according to the invention can easily be transported as part of a train formation to the construction site and rapidly removed without necessitating any modification works.

During shuttle operation, the use of the bottom conveyor is in particular advantageous because bulk material received on one axial end from the bucket excavator can be stored while at the same time transported in direction to the opposite transfer end.

The box rests via support wheels on guide rails that are secured on the horizontal loading deck of the carrier frame, whereby at least one of the wheels is provided with a rotary drive.

According to another embodiment of a freight car according to the present invention, the freight car is equipped with an excavation unit in form of an excavating chain that is led around the carrier frame for removing bulk material and is vertically adjustable by its own drive. The excavation unit exhibits a discharge end positioned above the conveyor belt and an input end positioned beneath the conveyor belt.

The present invention is also concerned with a box for storage of bulk material which has a bottom formed by a longitudinally extending conveyor belt and is operated by its own drive, with the box resting on support wheels which project downwards beyond the conveyor belt in a direction perpendicular thereto and define an axis which extends perpendicular to the longitudinal direction and parallel to the conveyor surface defined by the conveyor belt.

The box according to the present invention is very simple in structure and can also be used in combination with a transport vehicle for laying an assembled track section onto a trackless construction site. As the transport vehicle loaded with assembled track sections is of substantial length, the support wheels afford the box with a mobility on the transport vehicle so that the box can be shuttled between the loading end and the opposite end of the transport vehicle.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
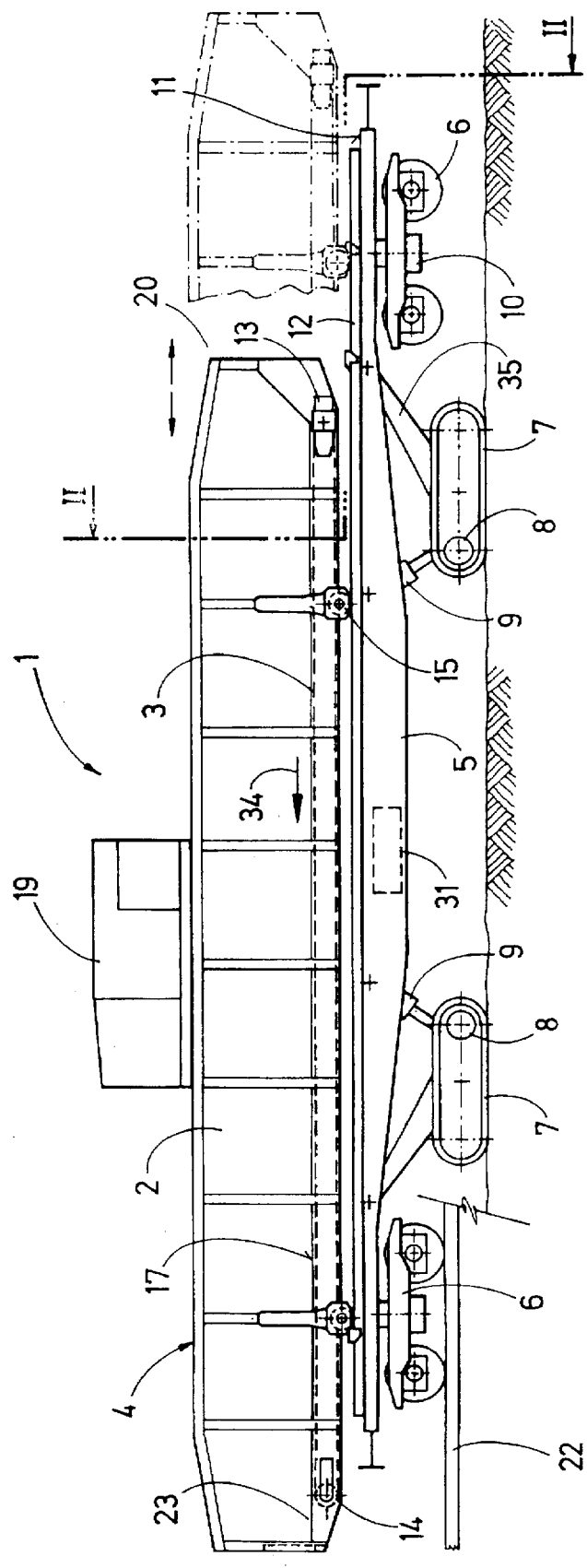
FIG. 1 is a side elevational view of one embodiment of a freight car according to the present invention.

Throughout all the Figures, the same or corresponding elements are always indicated by the same reference numerals.

Turning now to the drawing, and in particular to FIG. 1, there is shown a side elevational view of one embodiment of a freight car according to the present invention, generally designated by reference numeral 1 and substantially comprised of a box 4 for storing the bulk material and an elongated carrier or flatbed frame 5. The box 4 is formed by parallel side walls 2 extending in longitudinal direction alongside a conveyor belt 3 which constitutes the bottom of the box 4 and forms a conveying surface 17 extending in longitudinal direction to convey the bulk material inside the box 4 in a conveying direction, as indicated by arrow 34.

The carrier frame 5 includes two track-bound undercarriages 6, respectively positioned at axial ends of the carrier frame 5 for enabling mobility on a track, and two off-track undercarriages 7 disposed immediately adjacent and inwardly of the track-bound undercarriages 6 and spaced from each other in longitudinal direction. Thus, the carrier frame 5 can be selectively supported by the track-bound undercarriages 6 or the off-track undercarriages 7. Each off-track undercarriage 7 is formed as crawler-type truck with its own drive 8 and is pivotally connected to the carrier frame 5 by a bracket 35 which is actuated by its own drive 9 for vertically adjusting the undercarriage 7. Each track-bound undercarriage 6 is also provided with its own drive 10.

The carrier frame 5 has a loading deck 11 to form a horizontal surface. Detachably secured on the horizontal surface of the loading deck 11 are two guide rails 12 which extend in longitudinal direction of the carrier frame 5 and are spaced from each other in transverse direction to form a track. As shown in particular in FIG. 2, the conveyor belt 3, which forms the bottom of the box 4 between the side walls 2, runs continuously by means of a drive 13 about deflection pulleys 14 positioned at the axial ends of the box 4. Four wheels 15 support the box 4 on the guide rails 12 and project downwards beyond the conveyor belt 3 in a direction perpendicular thereto. At least one of the wheels 15, preferably each wheel 15, is driven by its own rotary drive 18 for rotation about an axis 16 which extends perpendicular to the longitudinal direction of the box 4 and parallel to the conveyor plane 17 of the conveyor belt 3. Engine 19 is mounted on top of the box 4 for supplying energy to the conveyor belt 3.

Figure 2:
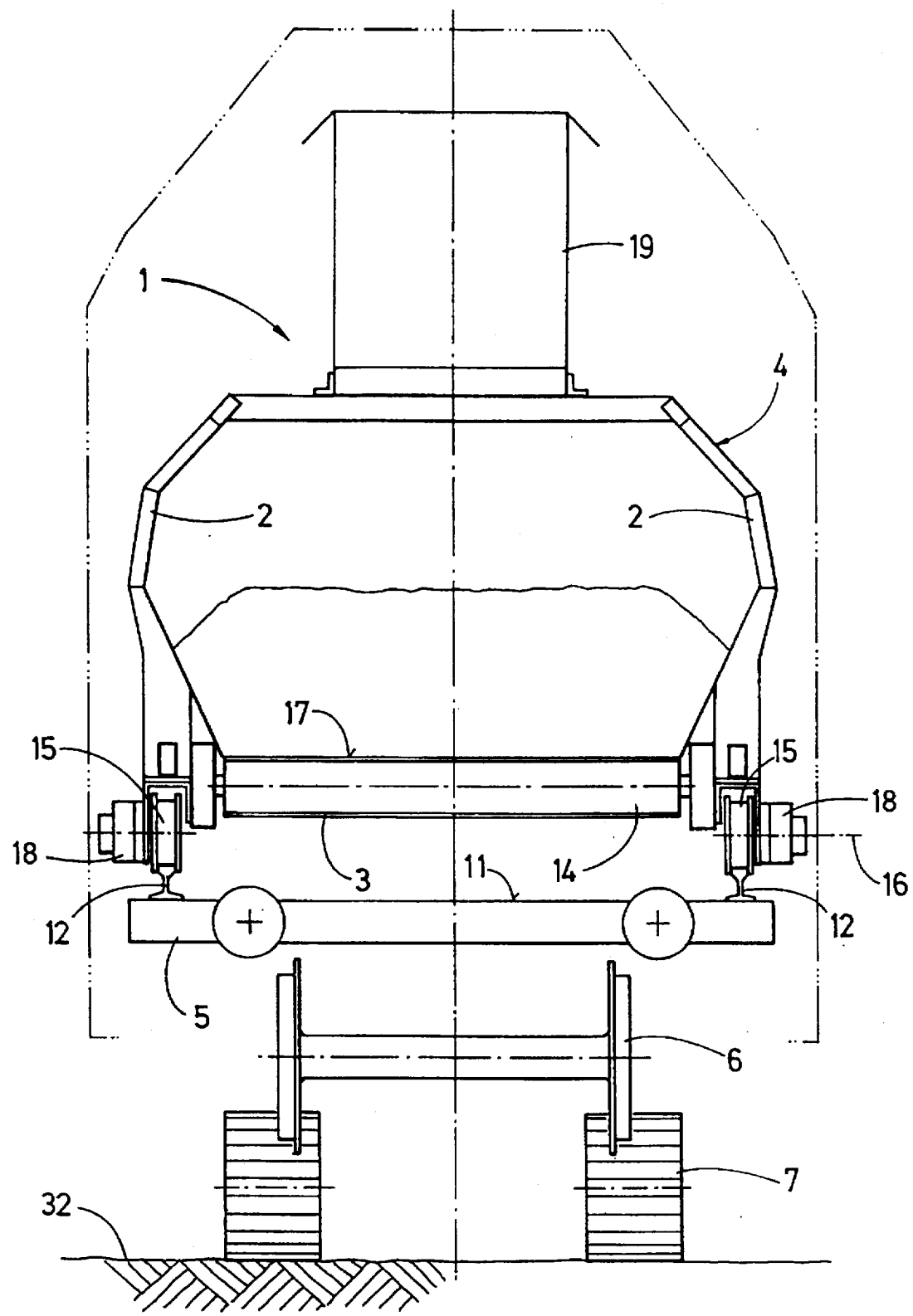
FIG. 2 is a sectional view of the freight car, taken along the line II—II in FIG. 1.

The freight car 1 shown in FIGS. 1 and 2 and formed by the undercarriages 6 and 7 as well as by the carrier frame 5, may also be used as transport vehicle which is self-propelled by a motor 31 for laying an assembled track section, as described e.g. in U.S. Pat. No. 4,784,063, by simply removing the box 4 and the guide rails 12. Typically, the loading deck 11 for transporting assembled track sections should be of great length in order to accommodate the track sections. Compared to the loading deck 11, the box 4 is of shorter length for weight reasons and is movable along the guide rails 12 relative to the carrier frame 5 via the wheels 15 to effect an efficient loading and unloading operation.

Figure 3:
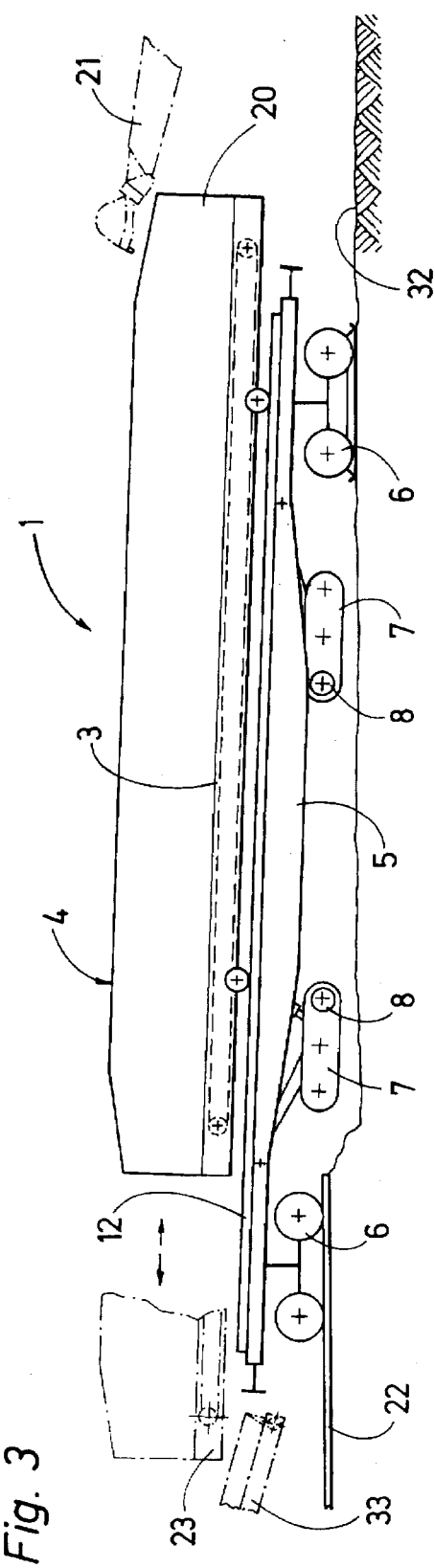
FIG. 3 is a side elevational view, on a reduced scale, of the freight car of FIG. 1 during loading operation.

Turning now to FIG. 3, there is shown a side elevational view, on a reduced scale, of the freight car 1 during loading operation, in which the box 4 is shifted all the way to the right so that the receiving end 20 of the box 4 projects beyond the axial end of the carrier frame 5 to thereby enable an unimpeded loading of the box 4 by means of a bucket excavator 21, indicated schematically by dashdot lines. This end position of the box 4 is also shown in FIG. I by dashdot lines. The loading operation can be facilitated by elevating the off-track undercarriage 7 positioned in the area of the receiving end 20 so that the freight car 1 is supported on the exposed subgrade 32 by the respective undercarriage 6 positioned on that end. During loading, the conveyor belt 3 is slowly advanced by drive 13 in longitudinal direction to store bulk material at a desired dumping height. As soon as the box 4 is filled, the freight car 1 is moved in direction to a track 22 on the subgrade 32 by the off-track undercarriages 7 through actuation of the drives 8. During travel of the freight car 1 to the track 22, the box 4 can already be shifted by the rotary drives 18 to the left toward the end position as shown in solid lines in FIG. 1 and in dashdot lines in FIG. 3. In this other end position, the discharge end 23 projects beyond the axial end of the carrier frame 5 to enable an unhindered transfer of bulk material to a further conveyor belt 33 that extends obliquely with regard to and with its input end underneath the conveyor belt 3.

Figure 4:
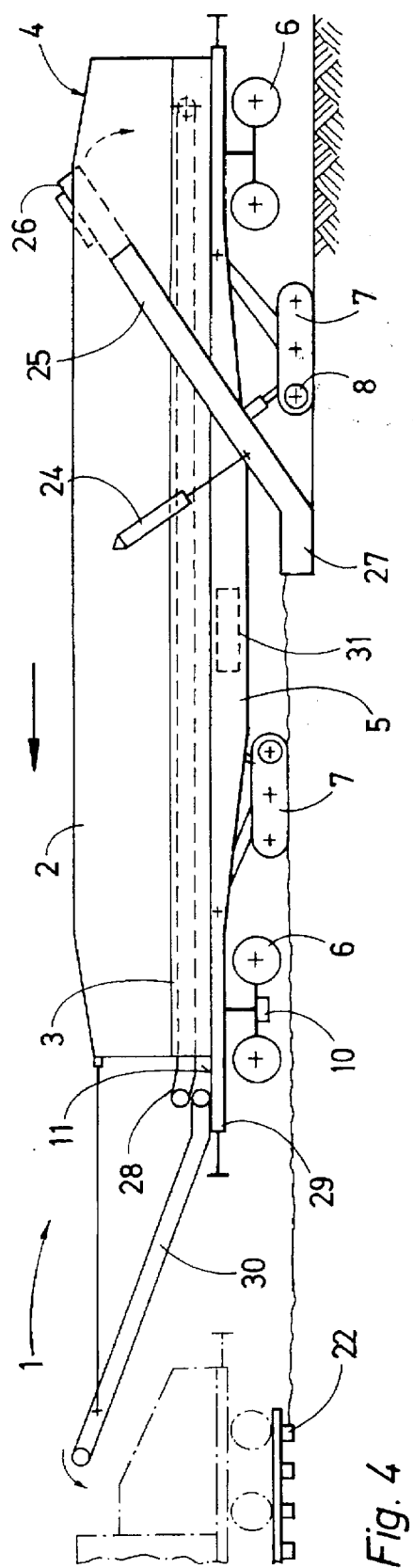
FIG. 4 is a side elevational view of another embodiment of a freight car according to the present invention.

Turning now to FIG. 4, there is shown a side elevational view of another embodiment of a freight car 1 according to the present invention, with the freight car 1 being provided with an excavation unit 25 in form of endless excavating chain which is led around the carrier frame 5 on one longitudinal end of the freight car 1. The excavation unit 25 is vertically adjustable by drives 24 and exhibits an upper discharge end 26 which is positioned above the conveyor belt 3 and inside both side walls 2. A lower input end 27 of the excavation unit 25 receives bulk material and is positioned underneath the conveyor belt 3.

The conveyor belt 3 has two axial ends, with the one axial end 28 which is distant from the excavation unit 25, being disposed adjacent a transfer conveyor belt 30 that extends obliquely in relation to the loading deck 11 and projects beyond an axial end 29 of the carrier frame 5.

The freight car 1 according to FIG. 4 eliminates the need for use of a separate bucket excavator because bulk material is removed by the own excavation unit 25 of the freight car 1 and transported into the box 4.

While the invention has been illustrated and described as embodied in a freight car for storage of bulk material, it is not intended to be limited to the details shown since various modifications and structural changes may be made without departing in any way from the spirit of the present invention.

What is claimed as new and desired to be protected by Letters Patent is set forth in the appended claims:

We claim:

1. A freight car; comprising:

a carrier frame extending in a longitudinal direction;

a first undercarriage assembly enabling a support of the carrier frame on a track;

a box formed by side walls and a bottom for storing bulk material;

a first conveyor belt forming the bottom of the box and extending in the longitudinal direction for conveying bulk material in a conveying direction;

first drive means for operating the conveyor belt, a second undercarriage assembly including two, off-track undercarriages spaced from each other in the longitudinal direction; and second drive means for vertically adjusting the two undercarriages independently from each other.

2. The freight car of claim 1 wherein the carrier frame exhibits a horizontal loading deck for supporting the box.

3. The freight car of claim 2 wherein the box is detachably secured to the loading deck of the carrier frame.

4. The freight car of claim 1, and further comprising an engine mounted to the box for supplying energy to the first drive means.

5. The freight car of claim 2, and further comprising guide rails secured on the loading deck of the carrier frame for formation of a track in said longitudinal direction, said box being resting on support wheels for placement on the guide rails.

6. The freight car of claim 5 wherein at least one of the support wheels includes a rotary drive.

7. The freight car of claim 5 wherein the guide rails are detachably secured to the loading deck.

8. The freight car of claim 1, and further comprising an excavation unit for removing bulk material; and a third drive means for vertically adjusting the excavation unit, said excavation unit having a discharge end positioned above the conveyor belt and an input end positioned beneath the conveyor belt.

9. The freight car of claim 1, and further comprising a second conveyor belt adjoining the first conveyor belt at one longitudinal end thereof at an angle to the loading deck and projecting outwards beyond a longitudinal end of the carrier frame.

10. The freight car of claim 5 wherein the conveyor belt defines a conveying surface, each of the support wheels projecting downwards beyond the conveyor belt in a direction perpendicular to the conveyor belt and defining an axis extending perpendicular to the longitudinal direction and parallel to the conveyor surface of the conveyor belt.

* * * * *